United States Patent [19]

Zudall

[11] Patent Number: 4,780,030
[45] Date of Patent: Oct. 25, 1988

[54] MANUAL TAP GUIDE

[76] Inventor: Andrew Zudall, 4140 Mount Olney La., Olney, Md. 20832

[21] Appl. No.: 81,014

[22] Filed: Aug. 3, 1987

[51] Int. Cl.⁴ .............................................. B23B 47/00
[52] U.S. Cl. ..................................... 408/88; 108/102; 211/70.6; 144/286 R; 408/234; 408/241 R
[58] Field of Search ...................... 408/87, 88, 89, 90, 408/91, 110, 115 R, 241 R, 236, 237, 20, 234, 99

[56] References Cited

U.S. PATENT DOCUMENTS

| | | | |
|---|---|---|---|
| 393,511 | 11/1888 | Leland | 408/110 |
| 672,284 | 4/1901 | Nuttall | 408/236 |
| 804,869 | 11/1905 | Mitchell | 408/110 |
| 889,273 | 6/1908 | Thomas | 408/110 |
| 1,693,129 | 11/1928 | Willis | 408/110 |
| 2,309,777 | 2/1943 | Kowalske | 408/237 |
| 2,336,947 | 12/1943 | Marsilius | 408/87 |
| 2,413,677 | 1/1947 | Beitz | 408/88 |
| 3,267,501 | 8/1966 | Wright | 408/110 |
| 4,265,283 | 5/1981 | Nash et al. | 144/286 A |

FOREIGN PATENT DOCUMENTS

| | | | |
|---|---|---|---|
| 2703367 | 8/1978 | Fed. Rep. of Germany | 211/70.6 |
| 3326360 | 2/1984 | Fed. Rep. of Germany | 144/286 A |
| k881606 | 4/1943 | France | 408/87 |
| 1959 | of 1857 | United Kingdom | 408/91 |

*Primary Examiner*—Gil Weidenfeld
*Assistant Examiner*—Daniel W. Howell
*Attorney, Agent, or Firm*—Ronald R. Snider

[57] ABSTRACT

A manual tap guide having a base member which includes a drawer and a stiffening member for stiffening the base, a vertical upright, a horizontal support bar, and an arbor is shown and described. In this vertical tap guide, the arbor is rotated by hand, and may be positioned to any location on the table by means of adjustment of the horizontal support bar with respect to the vertical support.

19 Claims, 2 Drawing Sheets

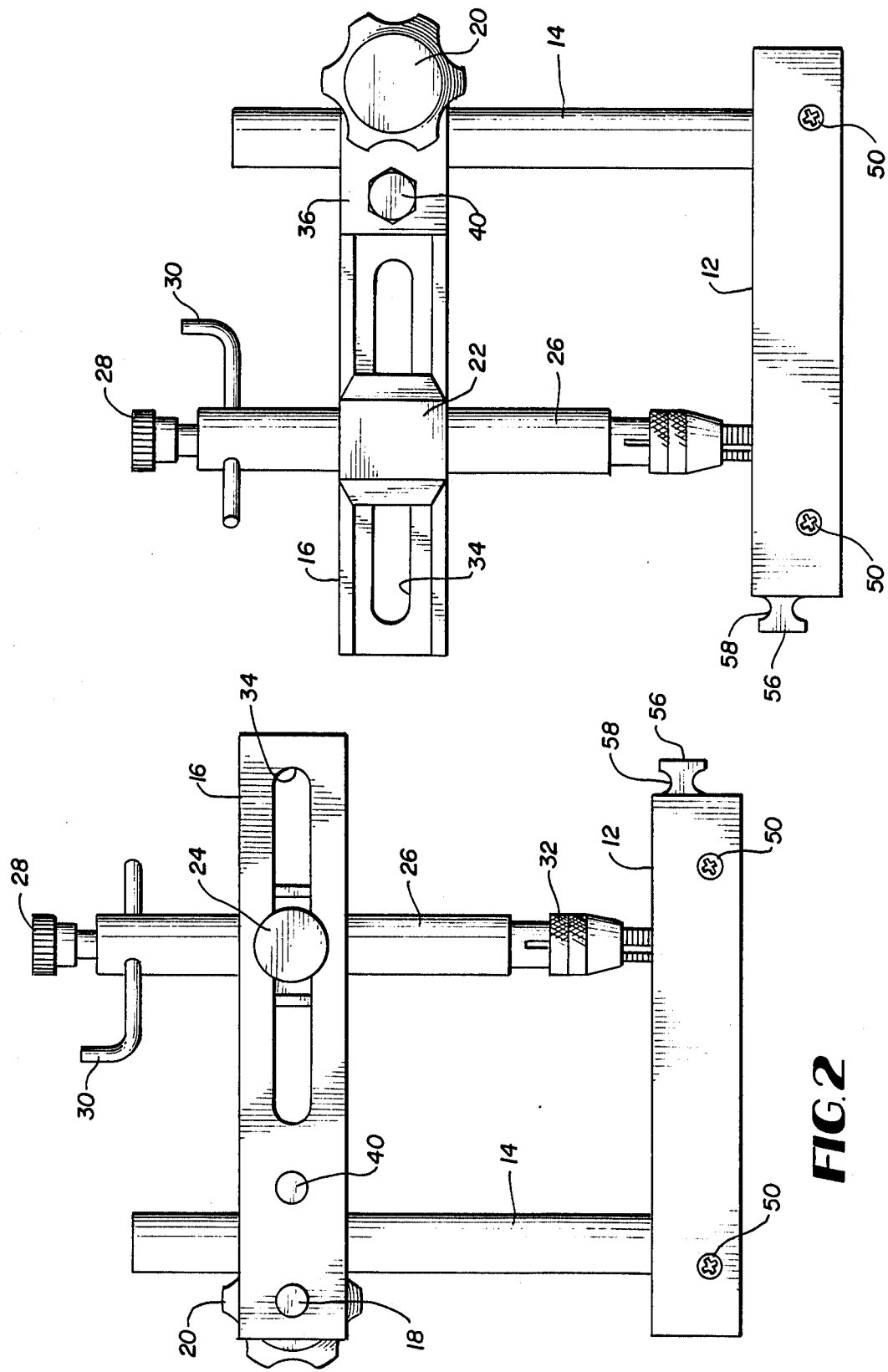

MANUAL TAP GUIDE

BACKGROUND OF THE INVENTION

1. Field of the Invention

This invention relates to a means for guiding a tap straight into a pre-drilled hole. In order to prevent misalignment, breaking of taps, and improperly threaded holes, it is necessary to provide for correct alignment of the tap with respect to the hole. The center line of the tap should be congruent to the center line of the hole to be tapped during the entire tapping operation.

2. State of the Art

This invention relates to a manual tap guide which is intended for use with small production facilities, or for homeshop use where high quantity production is not required, but where correct alignment is desired. U.S. Pat. No. 3,267,501 (Wright) shows a manually operated machine tool or tap guide which may be used to tap holes in a flat plate. This guide includes only one degree of freedom which is movement of the arbor in a vertical direction. Any adjustment to the tap hole will require movement of the entire assembly. U.S. Pat. No. 804,869 (Mitchell) shows a typical vertical alignment device which includes an arbor fixed with respect to the work piece. U.S. Pat. No. 1,693,129 (Willis) shows another hand-operated vertical shaft tool for alignment of a work piece with the tool. Willis does provide for adjustment of position along a slide or rack 7. U.S. Pat. No. 889,273 (Thomas) shows a boring jig which may be used to align a tool with a hole to be bored or machined. U.S. Pat. No. 393,511 (Leland) shows a typical tap driving head of the type that would be used on a drill press for running and guiding a tap.

In addition to the above-enumerated U.S. patents, the inventor of the invention herein has used in his machine shop a tap guide which includes a solid heavy metal base, a vertical member, a horizontal member along which the position of the tap guide can be adjusted, and a vertical arbor for rotating of a tap.

BRIEF SUMMARY OF THE INVENTION

This invention provides for a vertical location of an arbor used to drive a tap in a hole in three degrees of freedom. The bearing which supports the arbor may be raised or lowered by moving its horizontal support along a vertical upright member, moved horizontally along a channel-shaped horizontal support member and moved in a circle about the horizontal member therefore providing location of the tap at any location on the base. The base is constructed of two pieces of sheet metal which are joined together to form a rectilinear opening in the base. The base is stiffened by a stiffening member running through the rectilinear opening in the region of the vertical support attachment, and is further stiffened by a drawer which slides into the base. The drawer may hold spare taps, or other tools such as a countersink or reamer.

DESCRIPTION OF THE DRAWINGS

FIG. 2 shows a side view of the tap guide with the drawer in its inward position.

FIG. 4 shows an opposite side view which shows the location of a knob for clamping the vertical support member and location of the block used to hold the bearing for the vertical arbor.

DETAILED DESCRIPTION OF THE PREFERRED EMBODIMENT

Figure 1:
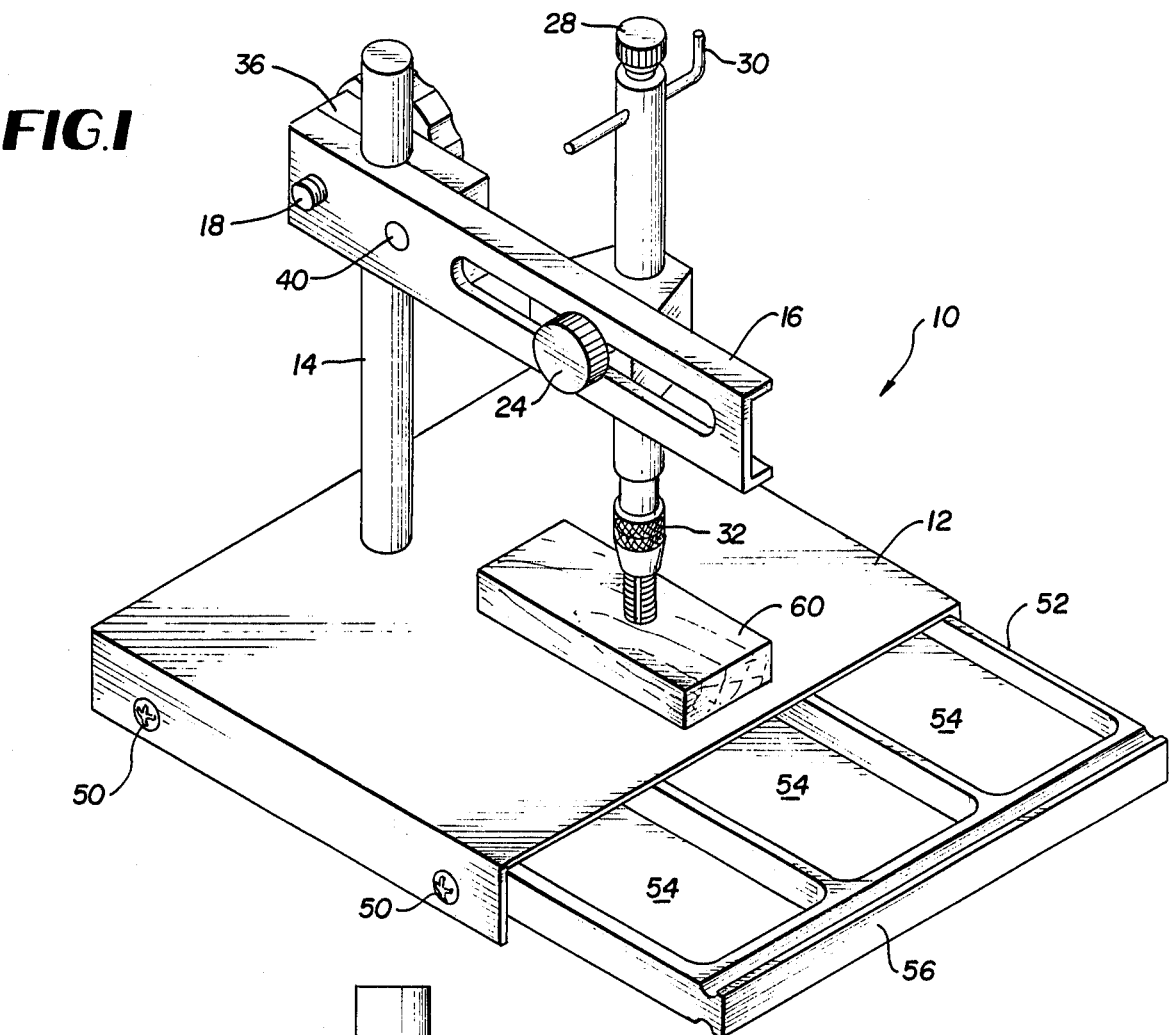
FIG. 1 shows a perspective view of the manual tap guide in accordance with this invention.

The tap guide 10 of FIG. 1 includes a base unit 12, a vertical support member 14, and a horizontal support member 16. The horizontal support member 16 can be adjusted vertically on the vertical support member by means of a screw 18 and a knob 20 (FIG. 4). By loosening the knob 20, the horizontal support member 16 may also be rotated about the vertical support member 14. Located on the horizontal support member 14 is a horizontally adjustable bearing block 22 (FIG. 4) which is locked in place by a screw knob 24. An arbor 26 provides for vertical as well as horizontal movement of the tap 62. At the top of the arbor 26 is located a screw knob adjustment 28 which is used to lock the position of handle 30 in position for manual rotation of the arbor 26.

At the bottom of the arbor 26, there is located a tool holding means 32 which may be any commonly available tap-holding chuck. The chuck is held in a force-fit or a threaded-fit relationship to the arbor 26.

The horizontal member is constructed of an aluminum channel which has an elongated slot 34 for providing horizontal movement of the block 22 which is adjusted by the knob and screw 24.

Figure 3:
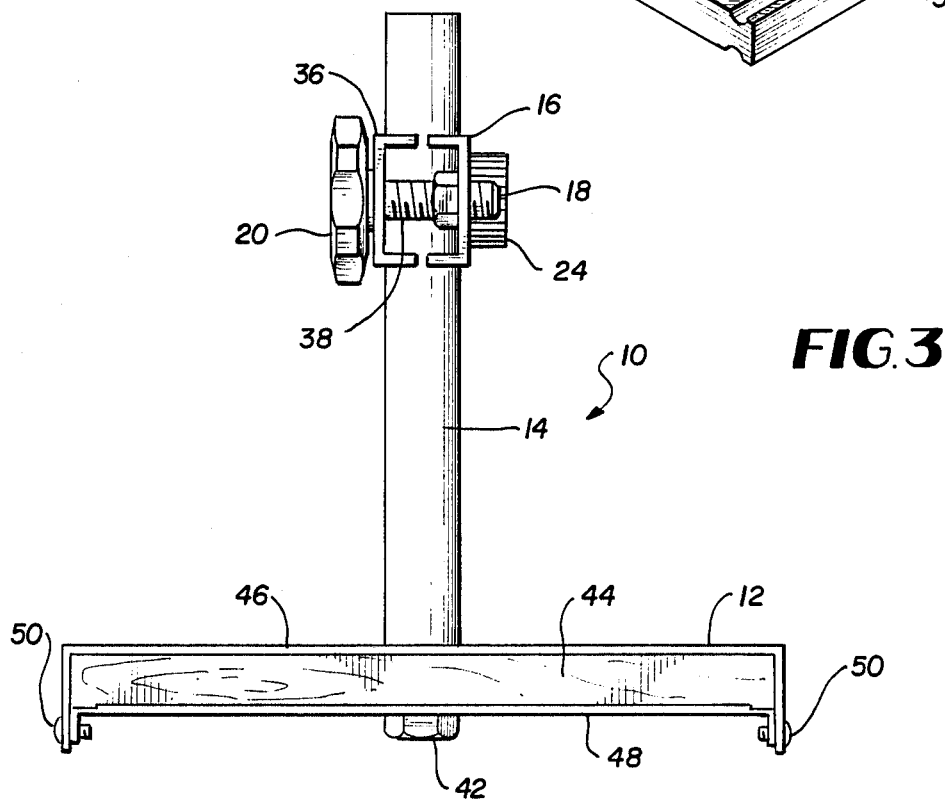
FIG. 3 shows a rear view of the tap guide showing a section of the stiffening block and the vertical support member.

The attachment to the vertical support member 14 is best seen from FIG. 3 which shows the knob 20, the horizontal support member 16, and a horizontal support clamp bar 36. The knob 20 engages a screw thread 38 which is fixed to the horizontal support bar 16. The clamp bar 36 is constructed also from a U-shaped channel, and is held in place by a bolt 40 (FIG. 4). The vertical support member 14 is fixed to the base 12 by means of a bolt 42 which extends through the base 12, and through stiffening block 44 which is included with said base.

The base 12 is built from a sheet metal such as aluminum and is constructed of two parts. A first U-shaped member 46 forms the upper surface of the base; 48 forms the bottom of the base. Screws 50 along both sides hold both U-shaped members together in the completed assembly. The U-shaped member 48 is slightly smaller in width than the member 50 thereby allowing U-shaped member 48 to fit within the arms of extension 50. The space between the two U-shaped members 46 and 48 is a rectilinear shape which provides a space for location of stiffener 44. The stiffener 44 is necessary because the aluminum or sheet metal base formed of U-shaped members 46 and 48 will have insufficient rigidity to hold the vertical member 14 in a stable vertical location.

Also included with the base is a drawer 52 which slides in and out of the rectilinear space between U-shaped members 46 and 48. Preferably, the drawer 52 is slightly smaller in thickness than the space between members 46 and 48, and slightly smaller than the stiffening member 44 which is at the rear of the unit and which holds the vertical support member. The drawer 52 may also include openings which are cut into the drawer. These openings are for the convenience of the user, and provide a place to keep small taps and other tools to be used with this tap guide. The drawer is preferably fabricated out of a single piece of particle board.

The horizontal stiffening member 44 may be built of any non-metallic material such as ply wood, particle board, or a stiff plastic. Similarly, the drawer 52 may be constructed of particle board, ply wood, or a stiff, rigid plastic.

The drawer 52 serves two functions which are the stiffening of the base 12, and the convenient storage of taps. The drawer includes an extension 56 which extends beyond the base when the drawer is in its fully closed position. The extension 56 has routed grooves 58 on the top and bottom which form a convenient holding device for opening and closing the drawer.

OPERATION

The manual tap guide is first adjusted vertically by means of knob 20 and sliding the horizontal member 16 vertically on vertical support 14. Before final clamping, the horizontal member 16 may also be rotated about vertical member 14 to a convenient location with respect to the work piece to be tapped. Next, the bearing block 22 is moved horizontally along the horizontal support member to the desired location, and clamped in place by means of screw knob 14. Work 60 may be placed upon the table and if the tap 62 does not extend all the way through the work 60, the tapping operation may begin. If the tap is to be extended all the way through the work piece 60, the work piece 60 may be elevated on the base 12 by means of shims or other spacers to allow for the passage of the tap through the work piece 60, but not to an extent that the tap will drive into the base 12.

A drawer 52 is provided for the convenience of the operator, the drawer 52 holding the taps which are not in use, and providing a convenient storage therefor. The drawer 52 during operation of the tap 62 provides for additional strength and support to the base 12 and prevents flexing of the base which would otherwise produce misalignment of the work piece 60 and the tap 62.

The tap guide of this invention is intended to be constructed of light-weight aluminum and conventionally obtainable parts throughout. The U-shaped members 46 and 48 may be made of aluminum sheet metal, the vertical support member 14 may be an aluminum tube or rod, and the horizontal member 16 may also be aluminum. The parts are designed for easy manufacture from conventionally obtainable aluminum extrusions and aluminum sheet metal. The tap holder 32 which is affixed to the arbor 26 is also a conventional tap holder. By this construction, a sturdy yet light-weight and economical arrangement is provided for the construction of manual tap guide.

While a preferred embodiment of the present invention has been disclosed, it will be understood that many modifications and changes may be made thereto without departing from the scope of the invention as defined in the following claims.

I claim:

1. A manually operable thread tapping tool for cutting an accurate thread in a hole of a work piece, said tool comprising a base, a vertical upright member mounted on said base, a horizontal arm adjustably mounted on said vertical upright member, a sliding block adjustably mounted on said horizontal arm having a vertical opening and a lock screw for holding said block in a fixed position on said horizontal arm, an arbor mounted on said vertical opening in said sliding block, a crank arm mounted on said arm, and a tap holding means mounted on the arbor, wherein said arbor is free for vertical sliding movement and rotational movement about its axis, and wherein said base is constructed of a sheet metal which is reinforced with a first stiffening block which runs through the location of said vertical upright member and said base if further reinforced and stiffened by a drawer member which slides into and out of said base.

2. The apparatus in accordance with claim 1 wherein said stiffening block is a non-metallic member.

3. The apparatus in accordance with claim 1 wherein said base has a first U-shaped member having ends which extend downward.

4. The apparatus in accordance with claim 3 wherein said base includes a second U-shaped member mounted within said first U-shaped member and wherein a rectilinear drawer opening is formed between said first and second U-shaped members.

5. The apparatus in accordance with claim 4 wherein said second U-shaped member is secured by its legs to the legs of said first U-shaped member.

6. The apparatus in accordance with claim 4 wherein said rectilinear opening has said first stiffening block filling a portion of the area between said U-shaped members through which a means for securing said vertical upright member to said base passes.

7. The apparatus in accordance with claim 1 where in said drawer is nonmetallic.

8. The apparatus in accordance with claim 1 wherein said drawer and said first block are constructed of particle chip board.

9. The apparatus in accordance with claim 2 wherein said non-metallic stiffening block is constructed of plywood.

10. The apparatus in accordance with claim 1 wherein said drawer is constructed of a stiff plastic material.

11. The apparatus in accordance with claim 1 wherein said drawer includes at least one recession in its upper surface for holding spare taps.

12. The apparatus in accordance with claim 4 wherein said U-shaped members are secured to each other by self-tapping metal screws extending through the side members of said U-shaped members.

13. The apparatus in accordance with claim 1 wherein said sliding block includes a bearing surface through which said arbor passes.

14. The apparatus in accordance with claim 1 wherein said drawer is monolithic and has an extension which projects beyond the edge of said base when the drawer is all of the way in against a stop formed by said first stiffening member.

15. The apparatus in accordance with claim 14 wherein said extension is formed by a groove cut in said drawer member and running from one side to the other of said drawer.

16. The apparatus in accordance with claim 15 wherein there is a groove on the bottom and the top of said drawer member.

17. The apparatus in accordance with claim 1 wherein said first stiffening block is thicker than said stiffening drawer member.

18. The apparatus in accordance with claim 1 wherein said horizontal arm is a drawn aluminum channel having a slot cut along a portion of its length for receiving a means for holding said block on said arm.

19. The apparatus in accordance with claim 1 wherein said drawer is constructed of a monolithic material such as particle chip board, plywood, or a stiff plastic material

* * * * *